United States Patent
Ramankutty et al.

(10) Patent No.: US 8,018,847 B2
(45) Date of Patent: Sep. 13, 2011

(54) SYSTEM AND METHOD FOR REDIRECTING REQUESTS

(75) Inventors: Rajesh Ramankutty, Nashua, NH (US);
Noel Charath, Bradford, MA (US);
Sanil Kumar Puthiyandyil, Nashua, NH (US)

(73) Assignee: Starent Networks LLC, Wilmington, DE (US)

( * ) Notice: Subject to any disclaimer, the term of this patent is extended or adjusted under 35 U.S.C. 154(b) by 350 days.

(21) Appl. No.: 11/599,959

(22) Filed: Nov. 15, 2006

(65) Prior Publication Data
US 2008/0112374 A1 May 15, 2008

(51) Int. Cl.
*H04L 12/26* (2006.01)
*H04L 12/28* (2006.01)
*H04W 4/00* (2009.01)

(52) U.S. Cl. ......... 370/230; 370/338; 370/351; 370/401

(58) Field of Classification Search .................. None
See application file for complete search history.

(56) References Cited

U.S. PATENT DOCUMENTS

| | | | |
|---|---|---|---|
| 6,434,627 B1 * | 8/2002 | Millet et al. ................ | 709/245 |
| 6,591,306 B1 * | 7/2003 | Redlich ....................... | 709/245 |
| 6,822,955 B1 * | 11/2004 | Brothers et al. ............. | 370/389 |
| 2001/0021175 A1 * | 9/2001 | Haverinen ................... | 370/230 |
| 2002/0057657 A1 * | 5/2002 | La Porta et al. ............. | 370/331 |
| 2002/0145993 A1 * | 10/2002 | Chowdhury et al. ........ | 370/338 |
| 2002/0191576 A1 * | 12/2002 | Inoue et al. ................. | 370/338 |
| 2003/0224788 A1 * | 12/2003 | Leung et al. ................ | 455/435.1 |
| 2003/0225900 A1 * | 12/2003 | Morishige et al. .......... | 709/230 |
| 2003/0229697 A1 * | 12/2003 | Borella ....................... | 709/226 |
| 2004/0063402 A1 * | 4/2004 | Takeda et al. ............... | 455/41.1 |
| 2004/0153525 A1 * | 8/2004 | Borella ....................... | 709/217 |
| 2005/0235044 A1 | 10/2005 | Tazuma | |
| 2006/0031394 A1 | 2/2006 | Tazuma | |
| 2006/0075139 A1 | 4/2006 | Jungck | |
| 2006/0291450 A1 | 12/2006 | Ramachandran et al. | |
| 2007/0036079 A1 | 2/2007 | Chowdury et al. | |
| 2007/0094712 A1 | 4/2007 | Gibbs et al. | |
| 2007/0189219 A1 | 8/2007 | Navali et al. | |
| 2007/0189255 A1 | 8/2007 | Navali et al. | |
| 2007/0253328 A1 | 11/2007 | Harper et al. | |
| 2007/0253371 A1 | 11/2007 | Harper et al. | |
| 2007/0254661 A1 | 11/2007 | Chowdhury et al. | |
| 2008/0062985 A1 | 3/2008 | Agarwal et al. | |
| 2008/0104210 A1 | 5/2008 | Ramankutty | |

OTHER PUBLICATIONS

Mockapetris, P. RFC 1035 Domain Names—Implementation and Specification, Nov. 1987, p. 44.*

* cited by examiner

*Primary Examiner* — Chirag G Shah
*Assistant Examiner* — Jenkey Van
(74) *Attorney, Agent, or Firm* — Wilmer Cutler Pickering Hale and Dorr LLP

(57) ABSTRACT

Systems and methods for intercepting and redirecting requests are provided. More particularly, certain information is identified in a packet and the packet is redirected to a specified server. The information that is redirected may be bound for a server in a network that a mobile node is currently visiting, and it is advantageous to fulfill the request in another network instead. The request is redirected to the other network; however, the response to the request may be modified changing the source address and other information so that the response appears to have originated from the server in the visited network to which the mobile node sent the request. Load balancing may also be incorporated when redirecting requests from one or more mobile nodes.

18 Claims, 3 Drawing Sheets

SYSTEM AND METHOD FOR REDIRECTING REQUESTS

TECHNICAL FIELD OF THE INVENTION

The present invention relates to intercepting and redirecting requests. More particularly, it relates to identifying information in a packet and redirecting packets that match certain criteria for processing.

BACKGROUND OF THE INVENTION

Wireless communication systems and networks are used in connection with many applications, including, for example, satellite communications systems, portable digital assistants (PDAs), laptop computers, and mobile nodes (e.g., cellular telephones). One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile subscriber. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized." That is, the data is divided into separate segments of information, and each segment receives "header" information that may provide, for example, source information, destination information, information regarding the number of bits in the packet, priority information, and security information. The packets are then routed to a destination independently, based on the header information. The data flow may include a number of packets or a single packet.

When a mobile node (e.g., a cell phone, PDA, or BlackBerry device) is roaming on a wireless network, it communicates with a visited network. The mobile node has a home network with which it is associated, and when the mobile node communicates with a visited network, the visited network typically communicates information back to the mobile node's home network. Sometimes this configuration prevents the mobile node from accessing certain information because of a firewall, which can be a problem.

SUMMARY OF THE INVENTION

Systems and methods for intercepting and redirecting information are provided. More particularly, certain information is identified and redirected in a wireless network to a specific server. In some embodiments, information that is bound for a server in a different network may be intercepted and redirected for fulfillment by a server in a chosen network instead. The server response to such an intercepted request may be modified by changing the source address and other information so that it appears that the response came from the server to which it was sent by the mobile node. Load balancing may also be incorporated when redirecting requests from one or more mobile nodes.

In accordance with the present invention, certain embodiments feature a system that redirects one or more requests, the system including a network device, an intercept proxy, a first server, and a second server. The network device is in communication with a mobile node. The intercept proxy resides on the network device. The first server resides in a first network and is in communication with the network device. The second server resides in a second network, and the intercept proxy intercepts a query addressed to the second server, sends a proxy query to the first server, and sends a response to the mobile node.

Further in accordance with the present invention, certain embodiments feature a process that redirects one or more requests by checking data packets received from a mobile node for information that matches a specified criteria, sending a data packet that matches the specified criteria by proxy to a server in a first network, retrieving information requested by the data packet that matches the specified criteria, changing a response to indicate the response originated from a second network, and sending the response to the mobile node.

Still further in accordance with the present invention, certain embodiments feature a system that redirects one or more requests, the system including a mechanism for providing a network device in communication with a mobile node; a mechanism for providing an intercept proxy residing on the mechanism for providing a network device; a first mechanism for providing a server residing in a first network and in communication with the mechanism for providing a network device; and a second mechanism for providing a server residing in a second network, wherein the mechanism for providing an intercept proxy: intercepting a query addressed to the second mechanism, sending the query by proxy to the first mechanism, and sending a response to the mobile node.

BRIEF DESCRIPTION OF THE DRAWINGS

The above and other advantages of the present invention will be apparent upon consideration of the following detailed description, taken in conjunction with the accompanying drawings, in which like reference characters refer to like parts throughout, and in which.

DETAILED DESCRIPTION OF THE INVENTION

In accordance with the present invention, systems and methods for redirecting information are provided. More particularly, certain information is identified and redirected in a network to a specified server. The present invention may be used in communication systems that provide for the wireless transmission of a data flow, regardless of the network and the protocol used. For example, in some embodiments a home agent can provide the identification of packets and the redirection in a system running a Mobile IP protocol, while in other embodiments a packet data serving node can provide the identification and redirection with a simple IP protocol. A network device is used to describe a device that functions as an access gateway and can be a home agent, a packet data serving node, a gateway general packet radio service support node, an access service network gateway, a layer two tunneling protocol network server, and a packet data interworking function. It is understood that certain features which are well known in the art are not described in detail in order to avoid complication of the subject matter of the present invention.

Figure 1:
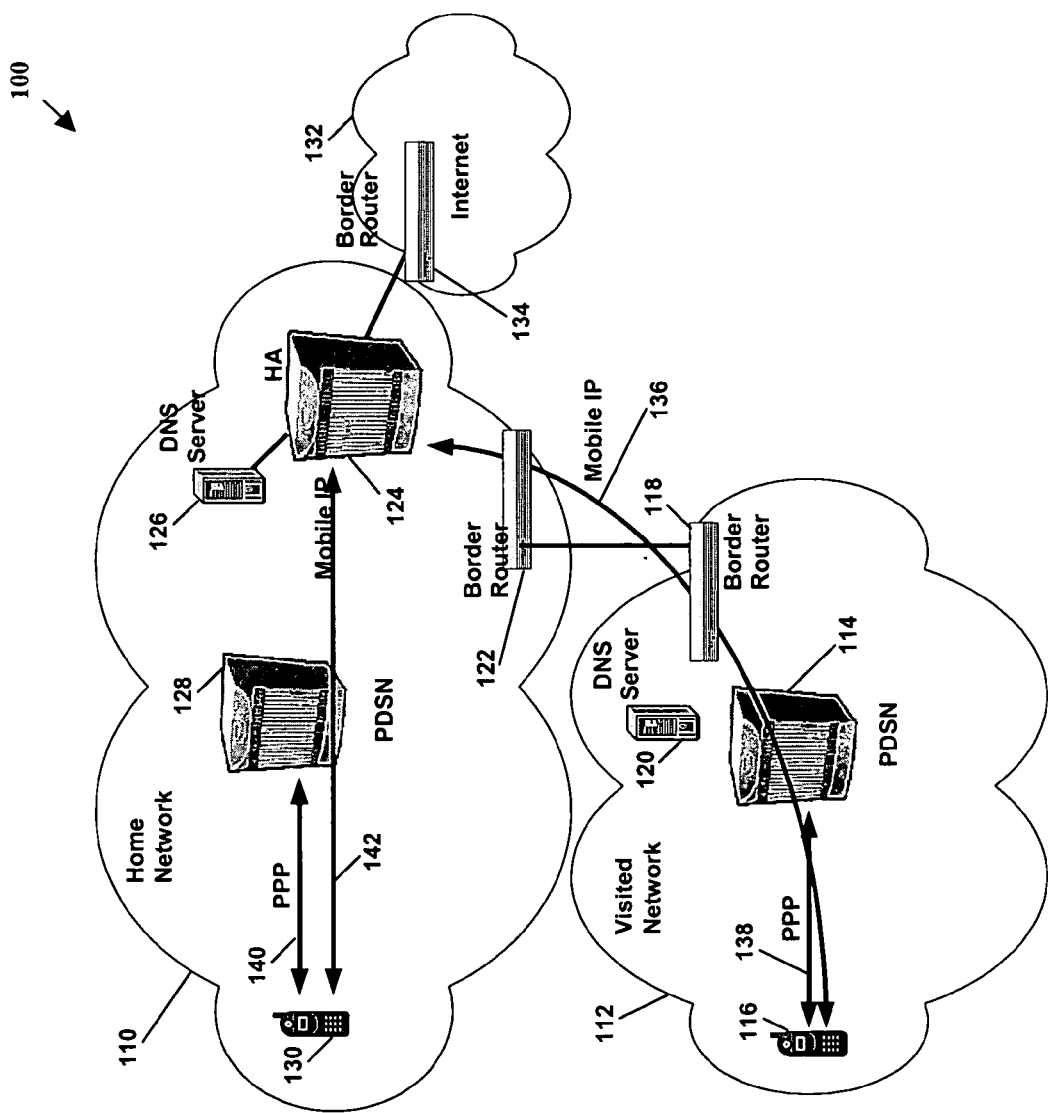
FIG. 1 is a schematic diagram of a network topology used for packet data transmissions in accordance with certain embodiments of the present invention.

FIG. 1 illustrates a Mobile IP based network topology 100 in accordance with certain embodiments of the present invention. Network topology 100 includes a home network 110, a visited network 112, a visited packet data serving node (V-PDSN) 114, a visited mobile node (V-MN) 116, a visited border router 118, a visited domain name service server (V-DNS) 120, a home border router 122, a home agent (HA) 124, a home domain name service server (H-DNS) 126, a home packet data serving node (H-PDSN) 128, a home mobile node (H-MN) 130, an internet connection 132, a border router 134, a mobile IP session 136, a point-to-point (PPP) session 138, a home PPP session 140, and home mobile IP session 142. As may be appreciated by one practiced in the field, routers, servers and other pieces of networking and communication equipment may also be included in network 100 depending on the embodiment.

In visited network 112, visited mobile node 116 is roaming. Home mobile node 130 is within its home network 110. Both mobile node 116 and mobile node 130 communicate with a packet data serving node 114 or 140 in their respective network. PDSNs 114 and 140 provide support for the establishment, maintenance, and termination of point-to-point (PPP) connections 138 and 140. PPP connections 138 and 140 may be a link layer connection and include other components not shown. Other components that may be used between a mobile node and a PDSN are a base station, a base station controller, a packet control function, or any other radio access network (RAN) devices. The PPP connection can allow the establishment of other connections or sessions, such as Mobile IP, IPv4, IPv6, or other applicable protocols. As shown, mobile nodes 116 and 130 communicate with home agent 124 over a Mobile IP (MIP) session, such as mobile IP 136 and 142. Because home agent 124 is located in home network 110 and mobile node 116 in visited network 112, the communication between the two involves visited border router 118 and home border router 122. Those practiced in the field will recognize that other devices may be used in this communication session.

Home agent 124 can provide mobile nodes 116 and 130 with information used during the MIP session and route information to mobile node 116, which is attached to a visited network. Home agent 124 can also record information or forward information to other devices in certain embodiments. An example of this is providing domain name service (DNS) to locate information by a name other than an address, such as an IP address. The DNS server may be located on a separate server in the network, such as home DNS server 126. When home DNS server 126 is located separately, home agent 124 communicates with home DNS server 126 to provide the desired service to mobile nodes 130 and 116.

An intercept proxy can be used to provide a roaming mobile node 116 access to services, such as DNS services. The intercept proxy is implemented in home agent 124 in some embodiments, and may be implemented in software, hardware, firmware, microcode, or any combination of software and hardware. Software used in the programming of the intercept proxy may include C, C++, C#, Perl, Java, VLSI, Verilog, or any other applicable language. The intercept proxy intercepts queries relating to specified services and sends the query by proxy to the appropriate device in the home network. The queries may be intercepted using an include list. The include list uses identifying information such as IP address of servers in the visited network to determine which packets should be intercepted. An intercept proxy may be desirable if mobile node 116 is provided an address to a server, such as DNS server 120, in visitor network 112 that is unreachable from home network 110 or would add delay if fulfilled from visitor network 112. The server in the visited network may not be reachable because of a firewall or other security measures.

An example of an intercept proxy is a DNS intercept proxy. Typically, a mobile node receives information about a DNS server's IP address during PPP negotiation. When a mobile node is roaming, such as mobile node 116, an IP address is received for visited DNS server 120 during a PPP negotiation with visited PDSN 114. This is because visited PDSN 114 provides the IP address for the DNS server in visited network 112. After PPP session 138 is negotiated, mobile node 116 sets up a Mobile IP tunnel 136 to home agent 124 in order to access home network 110. If mobile node 116 sends a DNS query to DNS server 120, home agent 124 and home network 110 have to route the DNS query to DNS server 120. Routing the DNS queries back can be a problem because of firewalls and other measures used to prevent the network from attacks, such as denial of service attacks. Further, sending the request back to the visitor network can add response delay. In certain embodiments, an intercept proxy circumvents this problem by redirecting the information to resources available in home network 110 to fulfill the query from mobile node 116. For example, the DNS intercept proxy can intercept any DNS query and send the query by proxy to home DNS server 126. After the information is retrieved in home DNS server 126, the DNS responses are sent back to mobile node 116. In some embodiments, packet header information or other information is modified to show the originating address as visited DNS server 120 because mobile node 116 may reject or may not recognize a response from another server.

In certain embodiments of the present invention, the intercept proxy feature is implemented on Starent Network Corporation's ST16 Intelligent Mobile Gateway. The ST16 Intelligent Mobile Gateway can function can function in any of the roles of a network device. The intercept proxy feature may also be implemented on a PDSN, a combination PDSN/HA device, a Gateway General Packet Radio Service Support Node (GGSN), or any subscriber-aware edge router. As would be appreciated by one practiced in the field, devices shown in FIG. 1 may be combined with other illustrated or non-illustrated devices.

The intercept proxy feature may be implemented on a data flow or on a subscriber basis. When the intercept proxy feature is implemented on a data flow, more than one mobile node or session may be searched for packets that are to be redirected. On a subscriber basis, the packets originating from a mobile node's subscriber session are searched for packets that are to be redirected. In some embodiments, the packet search is coupled with other processing that occurs on the packet in home agent 124 or another device. A packet may be checked for whether the intercept proxy is enabled for the mobile node, the packet type, and the destination port number. If the checked criteria match the desired settings, then the packet is compared against an include list.

The include list may be part of an include/exclude list, which further checks whether the packet is going to be processed elsewhere. If there is a match in the include list, in some embodiments, the packet header of the query is modified. The packet header modifications may include configuring the source IP address to the proxy source address, configuring the destination IP address to a server in the home network that can fulfill the query, and inserting a transaction ID that is unique among the pending queries. After the modifications, the packet can be forwarded with the information to the specified server. The transaction IDs may be recycled to limit the number of bits needed, but the set of transaction IDs should be larger than the number needed at any one particular time. The transaction ID can be used to match the response with the request when the response is received and may also be used to store other corresponding information regarding the query such as source port, destination IP address, and the source IP address in a pending list. The pending list may be implemented in software or hardware to store information relating to the query. This information is used to reform the response before sending it back to mobile node 116.

Load balancing may be used when home network 110 includes multiple servers available for fulfilling a query. The load balancing can be implemented by alternating the sending of queries among the servers. The pattern may be round-robin, random, probabilistic, or based on information from the servers.

Figure 2:
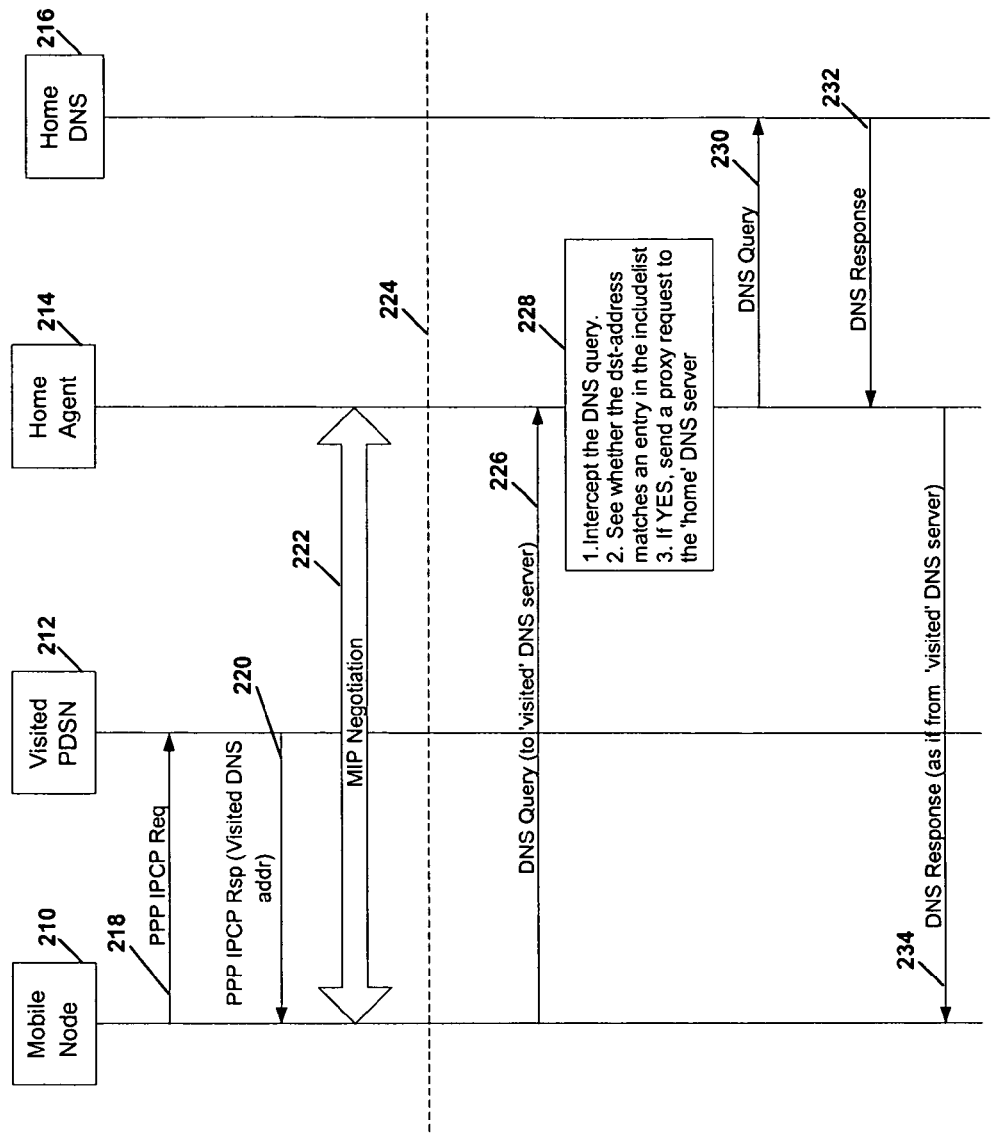
FIG. 2 is a schematic diagram of communication signaling in a network in accordance with certain embodiments of the present invention.

FIG. 2 illustrates a signaling diagram for redirecting requests in accordance with certain embodiments of the present invention. The devices illustrated are mobile node 210, visited PDSN 212, home agent 214, and home DNS 216. In step 218, the mobile node begins the process by sending a point-to-point (PPP) internet protocol control protocol (IPCP) request message. This request message asks visited PDSN 212 for various information. Visited PDSN 212 responds in step 220 with a PPP IPCP response message that includes the visited DNS server address. In some embodiments, other server addresses that are in the visited network are included. The response of step 220 allows a data link layer session to form between mobile node 210 and visited PDSN 212. A Mobile IP (MIP) tunnel is setup in step 222 between mobile node 210 and home agent 214. The MIP negotiation takes place because the home agent has the permanent address of mobile node 210 and information is routed through the home agent to mobile node 210.

After a break in time, indicated by reference 224, mobile node 210 generates a DNS Query in step 226. The DNS query is sent to home agent 214 and is addressed for delivery to a visited DNS server (not shown) because that is the address visited PDSN 212 sent mobile node 210 in step 220. Due to the MIP tunnel, home agent 214 may have trouble sending the query on to the visited DNS server (not shown). In step 228, the DNS query is intercepted at home agent 214 by the intercept proxy. The intercept proxy checks whether the destination address matches an entry in the include list. If there is a match, a proxy request is sent to the home DNS server 216. The DNS query is then sent in step 230. Home DNS server 216 sends a DNS response message in step 232. Home agent 214 takes the DNS response from step 232 and in step 234 sends a DNS response to mobile node 210; however, the DNS response in step 234 is changed so the source address indicates that it originated from the visited DNS server (not shown). Mobile node 210 can accept the response as valid because it matches the visited DNS address to which the original query was sent.

Figure 3:
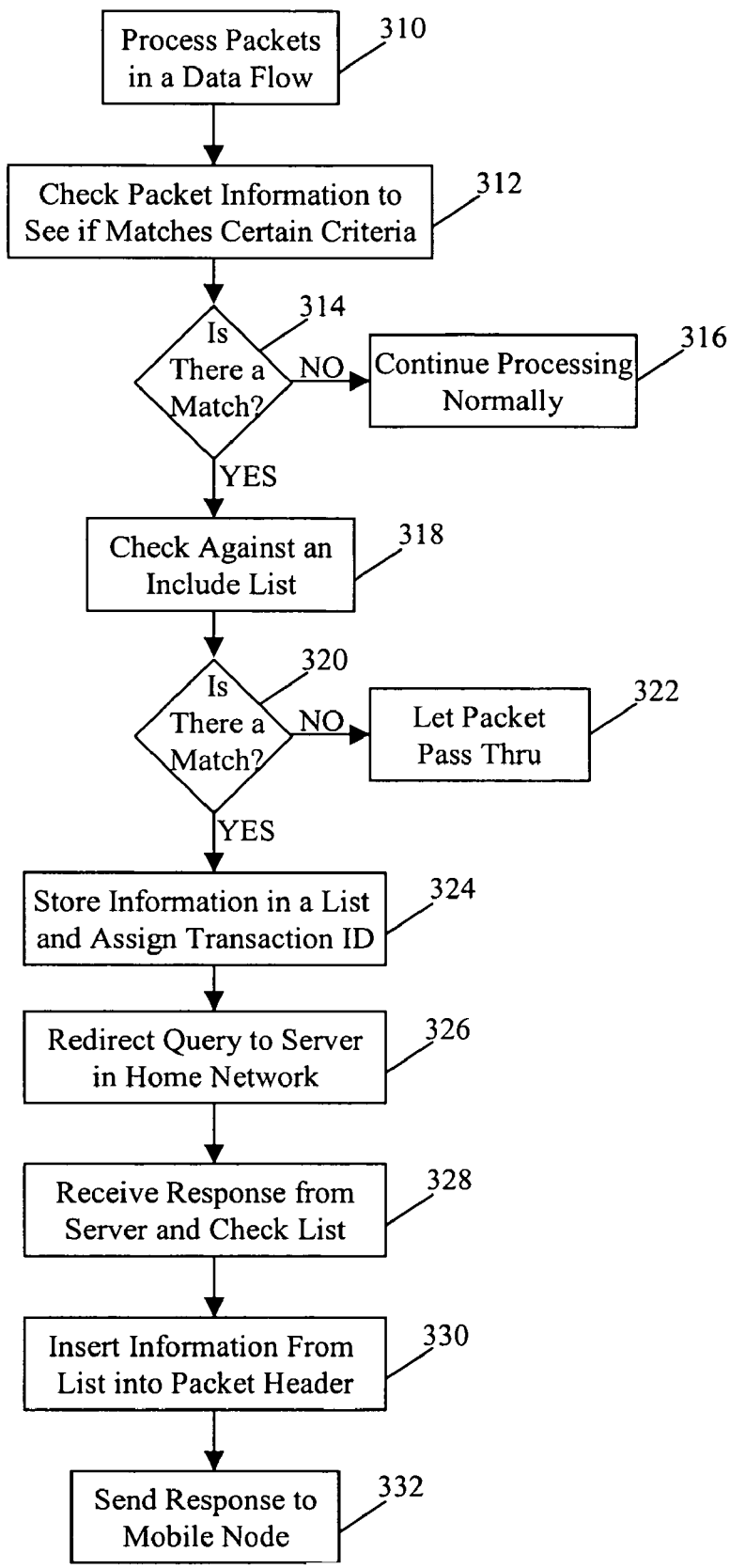
FIG. 3 is a flow diagram of steps in redirecting information in a network in accordance with certain embodiments of the present invention.

FIG. 3 illustrates a flow diagram of the intercept proxy feature in accordance with certain embodiments of the present invention. In step 310, packets are being processed in a data flow. The processing may occur at a home agent, a visited PDSN, a server, or a border router. Packet information, such as the packet header, is checked against certain criteria to see if there is a match in step 312. Whether there is a match is determined in step 314, and if no match is found, the packet is processed normally in step 316. If there is a match in step 314, the packet is checked against an include list in step 318. The include list includes the IP addresses that should be redirected for the information to be fulfilled. Whether there is a match in the include list check is determined in step 320. If there is no match in step 320, the packet passes through the intercept proxy feature in step 322. The checks of 312 and 318 can be implemented as a software filter (e.g., a context) in some embodiments.

If there is a match in the include list check in step 320, the process moves to step 324. In step 324, information from the packet, such as packet header information, is stored in a pending list and the packet is assigned a transaction ID. The transaction ID may be inserted into the packet header, the packet may be encapsulated with information including the transaction ID, or the transaction ID may be stored in the payload of the packet. The include list and the pending list may be implemented in software, hardware, or a combination thereof. The packet forming the query is redirected to a server in the home network in step 326. In step 328, a response is received back from the server and the pending list is checked for a match against the information in the packet of the response. Information from the list is inserted into the response packet header in step 330. Information that may be inserted into the packet header includes the address of the server in the visitor network for which the query was originally bound. In step 332, the response packet is sent to the mobile node.

An example of an implementation of a DNS Intercept Proxy is provided below. As one practiced in the field will appreciate, the DNS Intercept Proxy is not limited to a specific protocol or a specific implementation. When a session configuration is loaded, a dns-proxy intercept-list is loaded as part of the session configuration. As packets from the mobile node are processed inside a session manager, which is implemented in software, the session manager checks three criteria. First, if a dns-proxy intercept-list is configured for the session associated with the packet. Second, if the packet is a user datagram protocol (UDP) packet, and third that the destination-port-number is DNS (e.g., port 53). If the above criteria match, then the destination-ip-address is matched against an include list. If the ip-address matches the include list, the UDP packet is forwarded to one of the configured DNS, which can be primary or secondary, in a UDP packet with:
source-ip-address=dns-proxy source-address configured
destination-ip-address=dns-server's ip-address
destination-port=53 (DNS)
source-port=PROXY_DNS_REQ_MSG_SRC_PORT+
   sessmgr_instance_number (This source-port ID describes the originating session manger so the response can be properly directed when received from the DNS server.)

The UDP packet's transaction ID is set to a unique ID among the outstanding packets for the session manager The UDP packet's new Transaction ID is saved in a pending list in order to match the reponse with the request. In addition to the new Transaction-ID, the source-port, the destination-ip-address, the soure-ip-address, and the UDP packet's original Transaction ID are also saved. This information is used to re-form the response back to the user. When a response comes back from the DNS server, the packet is checked against certain criteria and if it matches the packet is forwarded back to the session manager. The session manager looks up the session based on the response packet's Transaction ID. The packet is forwarded back to the subscriber (e.g., mobile node) in a new UDP datagram. The following fields are set using the information saved in the pending list:
source-ip-address=saved source-ip-address
destination-ip-address=saved destination-ip-address
destination-port=saved source-port
source-port=53 (DNS)
DNS packet's Transaction ID=saved UDP packet's original Transaction ID In certain embodiments, the dns-proxy intercept-list can be implement in an IP address and rule format. The IP address can be configured with a mask in the format a.b.c.d/x, where 0.0.0.0/0 implies all IP addresses match. In some embodiments, the IP address is configured for IPv6 addressing. If the IP address matches an action can be associated with the match such as redirect or pass-thru. A redirect can list more than one IP address to which a packet is redirected. Additionally, multiple tiers of matching can be used to implement actions on various IP addresses in the same network or subnet.

In some embodiments, the software is implemented in a high level procedural or object-orientated language such as C, C++, C#, Java, or Perl. The software may also be implemented in assembly language if desired. In certain embodiments, the software is stored on a storage medium or device such as read-only memory (ROM), programmable-read-only memory (PROM), or magnetic disk that is readable by a general or special purpose processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A system that redirects one or more requests from a mobile node, the system comprising:
    a network node in a packet data communication system for communication with a mobile node, the network node associated with a home network,
    the network node including an intercept proxy,
    the network node in communication with the mobile node via a visited network when the mobile node is visiting the visited network such that the mobile node is a visiting mobile node in the visited network,
    the network node in communication with a first server residing in the home network;
    the intercept proxy for:
        receiving a query from a visiting mobile node via the visited network, the query being directed to a second server via the visited network,
        sending the query to the first server in the home network, and
        sending to the mobile node a response to the query, the response being received from the first server.

2. The system of claim 1, wherein the intercept proxy causes the response sent to the mobile node to indicate that the response originated at the second server.

3. The system of claim 1, wherein the network node is in communication with the mobile node through a mobile IP tunnel.

4. The system of claim 1, wherein the first server and the second server are domain name service (DNS) servers.

5. The system of claim 1, wherein the intercept proxy assigns a transaction ID to the query and stores information about the query in a pending list.

6. The system of claim 1, further comprising a third server in the home network, and wherein the intercept proxy uses load balancing between the first server and the third server.

7. The system of claim 1, wherein the network node is one of a home agent and a packet data serving node.

8. A method comprising:
    receiving data packets from a remote node at a network node, the remote mobile node in communication with a visited network, the data packets including a query for information that matches specified criteria, the query being directed to a visited network server in the visited network;
    intercepting the query en route to the visited network server at the network node;
    sending the query to a home network in a home network by proxy, the query being received at the home network from the visited network, the query including the specified criteria;
    receiving from the home network server a response with information requested in the query by the mobile node;
    causing the response to the query to indicate that the response originated from the visited network server; and
    sending the response to the mobile node.

9. The method of claim 8, wherein the receiving is conducted in at least one of a home agent and a packet data serving node.

10. The method of claim 9, wherein the receiving includes matching the query against an include list.

11. The method of claim 8, further comprising:
    generating a transaction ID for the query after it is received;
    storing information relating to the query in a pending list; and
    matching the response to the transaction ID to change the response to cause the response to indicate that the response originated from the visited network.

12. The method of claim 11, wherein the information includes a source port, a destination IP address, and a source IP address.

13. The method of claim 11, further comprising changing a source IP address to include the address of the visited network server in the visited network to which the data packet was originally intended to go.

14. The method of claim 8, wherein the home network server is a domain name system (DNS) server.

15. The method of claim 8, further comprising sending the query to one of a plurality of servers in the home network and using load balancing to distribute the query.

16. A method comprising:
    a mobile node, associated with a home network and in communication with a visited network such that the mobile node is a visiting mobile node in the visited network,
    the mobile node providing a query to a first DNS server in the visited network based on an address previously received for the first DNS server, wherein the query is intercepted by a network node and not received by the first DNS server, and wherein the query is sent to the home network by proxy; and
    the mobile node receiving a response to the query from the home network, wherein the response is provided from a second DNS server in the home network, wherein the response message sent to the mobile node in response to the query indicates that the response message is from the first DNS server in the visited network.

17. The method of claim 16, wherein the query is provided to a home agent through a mobile IP tunnel.

18. Logic encoded in one or more non-transient media that includes code for execution and when executed by a processor is operable to perform operations comprising:

receiving data packets from a remote mobile node at a network node, the remote mobile node in communication with a visited network, the data packets including a query for information that matches specified criteria, the query being directed to a visited network server in the visited network;

intercepting the query en route to the visited network server at the network node;

sending the query to a home network server in a home network by proxy, the query being received at the home network from the visited network, the query including the specified criteria;

receiving from the home network server a response with information requested in the query by the mobile node;

causing the response to the query to indicate that the response originated from the visited network server; and sending the response to the mobile node.

* * * * *

UNITED STATES PATENT AND TRADEMARK OFFICE
CERTIFICATE OF CORRECTION

PATENT NO. : 8,018,847 B2
APPLICATION NO. : 11/599959
DATED : September 13, 2011
INVENTOR(S) : Rajesh Ramankutty et al.

It is certified that error appears in the above-identified patent and that said Letters Patent is hereby corrected as shown below:

Please correct Column 8 line 6 - 24 claim 8 to read as follows:

8.    A method comprising:

receiving data packets from a remote <u>mobile</u> node at a network node, the remote mobile node in communication with a visited network, the data packets including a query for information that matches specified criteria, the query being directed to a visited network server in the visited network;

intercepting the query en route to the visited network <u>server</u> at the network node;

sending the query to a home network server in a home network by proxy, the query being received at the home network from the visited network, the query including the specified criteria;

receiving from the home network server a response with information requested in the query by the mobile node;

causing the response to the query to indicate that the response originated from the visited network server; and sending the response to the mobile node.

Please correct Column 9, 10 line 1 - 9 claim 18 to read as follows:

18.    Logic encoded in one or more non- ~~transient~~ <u>transitory</u> media that includes code for execution and when executed by a processor is operable to perform operations comprising:

Signed and Sealed this
Thirteenth Day of August, 2013

Teresa Stanek Rea
*Acting Director of the United States Patent and Trademark Office*

CERTIFICATE OF CORRECTION (continued)
U.S. Pat. No. 8,018,847 B2 receiving data packets from a remote mobile node at a network node, the remote mobile node in communication with a visited network, the data packets including a query for information that matches specified criteria, the query being directed to a visited network server in the visited network;

intercepting the query en route to the visited network server at the network node;

sending the query to a home network server in a home network by proxy, the query being received at the home network from the visited network, the query including the specified criteria;

receiving from the home network server a response with information requested in the query by the mobile node;

causing the response to the query to indicate that the response originated from the visited network server; and sending the response to the mobile node.